10/26/76 OR 3,988,566

SR

United States Patent [19]

Vogts et al.

[11] 3,988,566

[45] Oct. 26, 1976

[54] AUTOMATIC PLASMA FLAME SPRAYING PROCESS AND APPARATUS

[75] Inventors: William A. Vogts, Middle Village, N.Y.; Horace S. Daley, Clifton, N.J.

[73] Assignee: Metco Inc., Westbury, N.Y.

[22] Filed: July 17, 1975

[21] Appl. No.: 596,771

Related U.S. Application Data

[63] Continuation of Ser. No. 259,987, June 5, 1972, abandoned.

[52] U.S. Cl. .............................. 219/121 P; 219/76; 321/25; 315/111.2

[51] Int. Cl.$^2$ .............................. B23K 5/00

[58] Field of Search .............. 219/121 P, 121 R, 74, 219/75, 76, 131 R, 131 WR, 137 R, 137 PS; 315/111.2; 321/25; 313/231.3

[56] References Cited

UNITED STATES PATENTS

| | | | |
|---|---|---|---|
| 2,935,312 | 5/1960 | Kilpatrick et al. | 219/75 X |
| 3,089,944 | 5/1963 | Mathews | 219/74 |
| 3,137,783 | 6/1964 | Addie | 219/74 |
| 3,223,819 | 12/1965 | Wittemann | 219/74 |
| 3,309,491 | 3/1967 | Jacobs | 219/74 |
| 3,471,674 | 10/1969 | Gage | 219/74 |
| 3,617,681 | 11/1971 | Dyson | 219/74 |
| 3,646,311 | 2/1972 | Cameron et al. | 219/137 |
| 3,684,942 | 8/1972 | Pettit, Jr. et al. | 321/25 X |
| 3,694,619 | 9/1972 | Nahuijsen et al. | 219/75 X |
| 3,736,403 | 5/1973 | Rogers et al. | 219/74 X |

*Primary Examiner*—J. V. Truhe
*Assistant Examiner*—G. R. Peterson
*Attorney, Agent, or Firm*—Burgess, Dinklage & Sprung

[57] ABSTRACT

A plasma flame-spraying apparatus, having a source of primary gas and a source of a secondary plasma gas, is provided with means for insuring that when the secondary gas in passed through the electric arc established in the flame-spraying apparatus, which secondary gas flow causes an increase in the voltage in the current of the circuit containing the arc, the current is suitably adjusted. The apparatus includes means for insuring that the ignition of the arc is established by pressing a single switch. There is also provided a closed loop system of determining the voltage changes in the arc circuit and for compensatingly regulating the current at a fixed plasma gas flow-through rate and composition to maintain a desired balance between current and secondary gas flow. Various automatic means are provided for insuring against excessive constriction of the confined electric arc within the nozzle of the apparatus or parts associated therewith.

3 Claims, 15 Drawing Figures

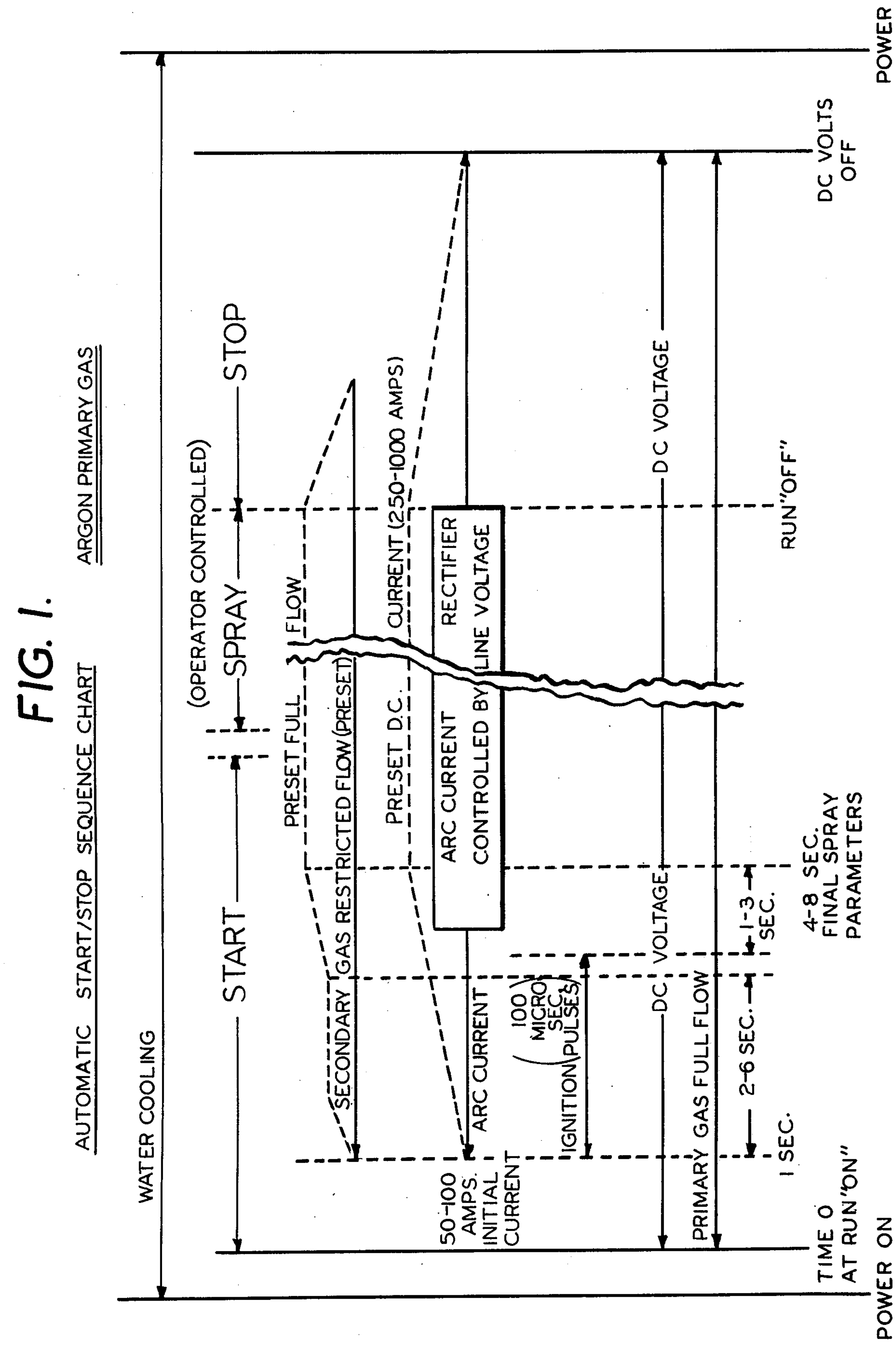
FIG. 1.
AUTOMATIC START/STOP SEQUENCE CHART
ARGON PRIMARY GAS
WATER COOLING
START
SPRAY
STOP
(OPERATOR CONTROLLED)
PRESET FULL FLOW
SECONDARY GAS RESTRICTED FLOW (PRESET)
PRESET D.C. CURRENT (250-1000 AMPS)
ARC CURRENT
ARC CURRENT CONTROLLED BY LINE VOLTAGE
RECTIFIER
50-100 AMPS. INITIAL CURRENT
IGNITION (100 MICRO SEC. PULSES)
DC VOLTAGE
D C VOLTAGE
PRIMARY GAS FULL FLOW
1 SEC.
2-6 SEC.
1-3 SEC.
4-8 SEC. FINAL SPRAY PARAMETERS
RUN "OFF"
TIME O AT RUN "ON"
POWER ON
DC VOLTS OFF
POWER FIG. 4.
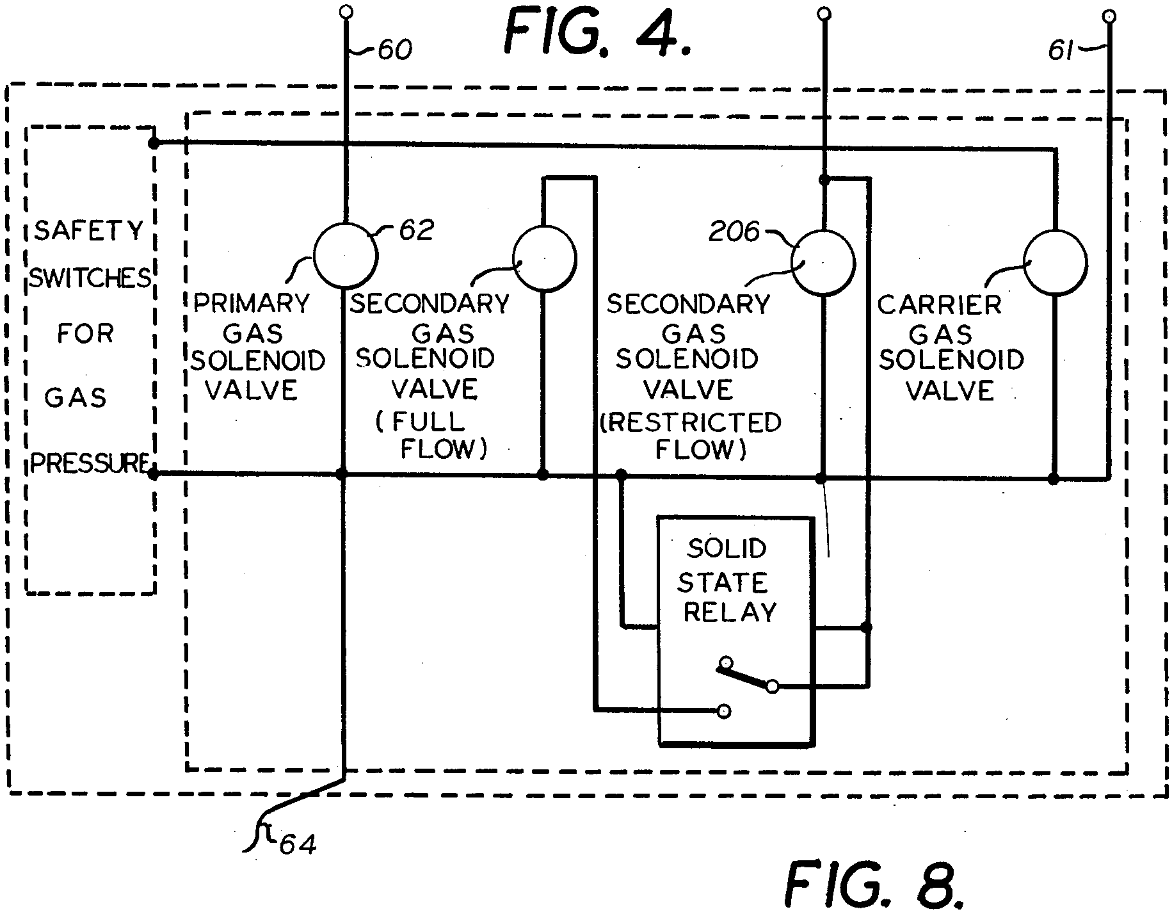
FIG. 8.
FIG. 6.
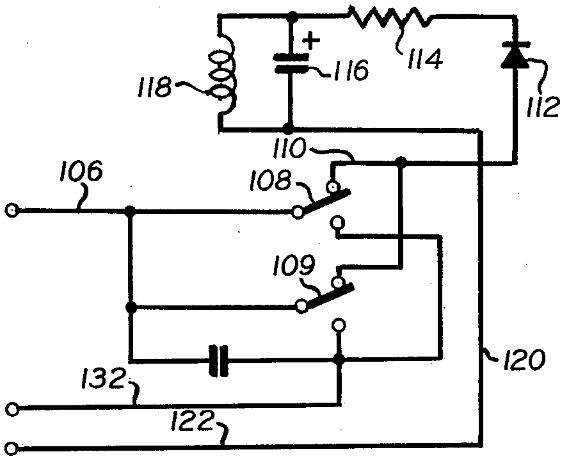
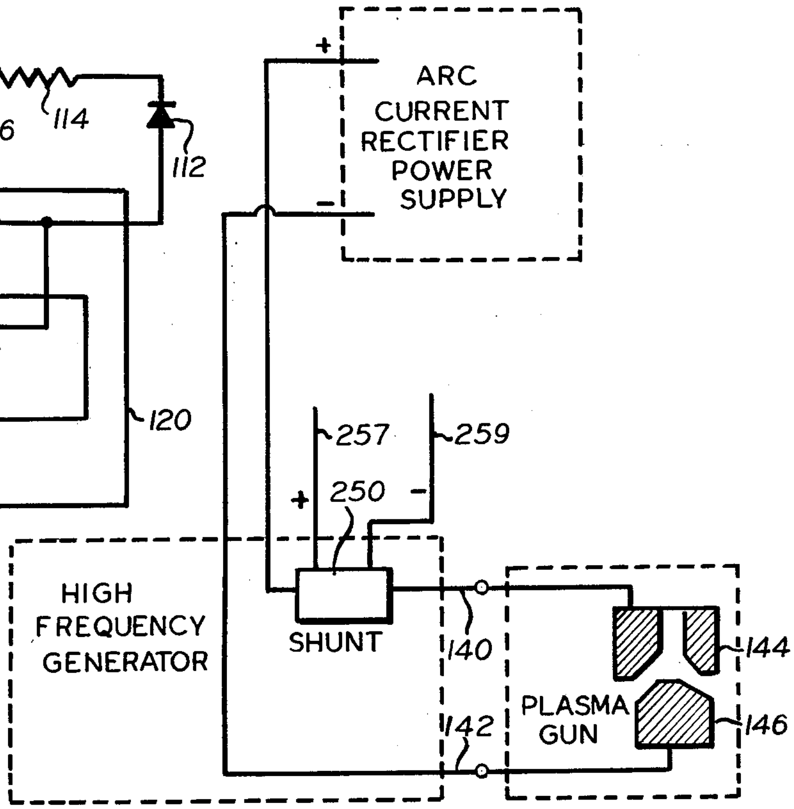

AUTOMATIC PLASMA FLAME SPRAYING PROCESS AND APPARATUS

This is a continuation of application Ser. No. 259,987, filed June 5, 1972, now abandoned.

BACKGROUND OF THE INVENTION

1. FIELD OF THE INVENTION

This invention is directed to an improvement in the electrical system of a plasma gas flame spraying process. More particularly, this invention is directed to means for insuring that when a secondary gas is passed through an electric arc established in a flame spray gun, which causes an increase in the voltage in the current of said circuit containing the electric arc, the current is suitably adjusted. This invention is also directed to means for insuring that ignition of the electric arc is established by the pressing of a single switch. The invention is also directed to a closed loop system of determining the voltage changes in a circuit containing an electric arc for use in plasma flame spraying and for compensatingly regulating the current at a fixed plasma gas flow-through rate and composition to maintain a desired balance between current and secondary plasma gas flow. This invention is directed to various automatic means for insuring a longer electrode and nozzle life and for insuring against excessive constriction of the confined electric arc within the nozzle of the flame spraying gun or parts associated therewith.

2. DISCUSSION OF THE PRIOR ART

Plasma flame spraying is a particular method whereby at least one gas is caused by virtue of its passage through an electric arc to be put into a plasma state. This plasma state corresponds to a higher energy state than the gaseous state. At such higher energy state, it has been found the gas assumes properties whereby it is an excellent heating medium. It has been disclosed, for instance, in U.S. Pat. No. 2,960,594, that extremely high temperatures on the order of 8,500° F. and upwards can be provided by passing a mixture of gases through a nozzle containing an electric arc. The arc is established between two oppositely polarized electrodes employing a current generally in the range of 155–1,000 amps. The gas can be heated to such an extent that powder fed at the nozzle of the gun can be so melted or heat softened that it can be sprayed onto a relatively cool workpiece. The high energy plasma state of the gas causes the particles to assume an elevated temperature state whereby they readily adhere to the workpiece of entirely different temperature. Numerous gases for use in plasma gas flame spraying can be used. These include in particular nitrogen, which has been found to provide an excellent primary gas.

In the development of the flame spraying technology as above described, it was found that additional gases, denominated secondary gases, provide extremely desirable properties. Thus, a minor amount of hydrogen added to a nitrogen or argon stream vastly improves the temperature of the plasma gas. Other typical secondary gases comprise: helium added to A or $N_2$, argon added to $N_2$, and nitrogen added to argon. However, the introduction of such hydrogen across the electric arc established in the nozzle of the gun increases the voltage through the circuit containing the electric arc at a phenomenal rate. Such voltage increase, if left uncompensated, causes a substantial diminishment of the circuit.

The flame spraying nozzles are so constructed that the arc is caused to be positioned over a relatively wide area within the nozzle. However, problems can be caused during start-up before the plasma gun has reached its optimum temperature, gas flow composition and flow rate, and arc distribution. Specifically, it has been found that a sheath of plasma forming gas around the arc tends to cool the outer periphery of the arc. This, in turn, reduces the amount of ionization of the plasma forming gases. Such reduction causes an increase in the electrical resistance of the outer periphery. This, in turn, causes more current to flow through the path of lesser resistance at the core of the arc, thus constricting the arc and increasing its temperature. The constriction of the arc is progressive, being greater at the inner end of the nozzle. By adjusting the proportion of the flow of gas to the flow of current, the arc can be made to spread gradually as it extends down the nozzle bore. This enables the arc to be spread in contact with any desired point in the bore. Indeed, an arc can even be established out of the nozzle toward the workpiece by suitable regulation of the flow of gas and the current to the arc.

It can be seen, therefore, that problems can arise due to excessive constriction of the arc. Specifically, if the arc constricts too much and becomes concentrated, damage can be done to the nozzle assembly. Because the temperatures employed are extremely high and the voltage within the circuit of the arc is extremely high, such damage can occur in a relatively short period of time. It has been found that even experienced operators of manual plasma gas flaming units cannot always adjust the gas flow against the current or resistance in the circuit of the arc such as to avoid the problem mentioned above. Hence, it has become highly desirable to provide a means whereby establishment of a desired broad arc can be accomplished automatically without any problems developing which could cause constriction of the arc and damage to the nozzle assembly.

It was initially believed that a suitable start-up procedure involved adjustment of the arc current to an arc current of 300 amperes. A secondary gas which would normally cause an increase in the voltage (a decrease in the current) could then be admitted through a needle valve. Voltage could be regulated by allowing the secondary gas to enter and be raised up until full flow, insuring that the amperage did not drop more than 25 amps for every five point increase in secondary gas flow. The amperage was not allowed to drop below 250 amps. However, this required some manual dexterity in that the arc current had to be adjusted with one hand while the secondary gas flow increase (or decrease) was adjusted with the other. Such a method required a certain quantum of skill not always possessed by those skilled in the flame spraying process itself, especially those operators somewhat unfamiliar with plasma gas flame spraying processes.

Hence, it has become highly desirable to provide an automatic means which will adjust the current increase and secondary gas flow rate such that optimum conditions are maintained in the plasma gas flame spraying nozzle. Such optimum conditions include a balance of voltage and current against secondary gas flow such that constriction of the electric arc does not occur. It has also become desirable to provide a means for accomplishing the same through use of timers independently associated with a secondary gas flow regulator and a regulator in electrical association with the arc current control, whereby an increase in both is responsive to time and the full flow of the secondary gas is established within a narrow time window based upon establishment of the final current through the electric arc.

Another problem has developed in the development of suitable automatic system for electrical control of the ignition and shut-down procedure. For some mysterious reason, occasionally the energization of a system would not initiate the electric arc. Since an automatic system is dependent upon the establishment of such an arc, problems resulted. Whereas, in manual operation the operator had only to throw a switch a second or third time to provide initiation of the electric arc, the automatic system is necessarily premised upon establisment of an electrical arc when a start-up switch is thrown. Hence, it has become desirable to provide a means for insuring the establishment of an arc during start-up.

It has become desirable also to provide a fully complete closed loop control automatic electrical system for a plasma gun, which system is capable of regulating an increase or decrease in the arc current or the secondary gas flow rate in response to electrical considerations determined within the nozzle itself.

SUMMARY OF THE INVENTION

Broadly, this invention contemplates a method of regulating the arc current in a plasma gas flame spraying nozzle equipped with an electrical circuit containing electrodes through which an arc is established, which process comprises regulating an increase in the flow of a secondary gas to the nozzle of said plasma flame spraying gun while regulating the increase in the current through the circuit containing said arc, the regulation of said current and the flow of said secondary gas being accomplished in response to a predetermined time for establishment of both final values with respect to one another.

In another embodiment, this invention contemplates a process for regulating the current through the arc established between two electrodes in a circuit maintained within the nozzle of a plasma flame spraying gun, which process comprises determining in said circuit an increase or decrease in the current or, alternatively voltage, from a predetermined level, at a fixed plasma gas composition and throughput level, compensatingly regulating the current in the circuit containing the electric arc to maintain the voltage at said predetermined level.

This invention further contemplates such a process in which the plasma flame spraying parameters, especially the gas flow rate of the secondary gas, are regulated at a predetermined voltage and current through the circuit containing the electric arc to maintain the voltage and correspondingly the current at a predetermined level. "Predetermined," as used herein, refers to a specific value at a specific time not necessarily constant over a period of time.

This invention further contemplates a method of insuring initiation of an electric arc in the circuit disposed within the nozzle of a plasma flame spraying gun, which process comprises pulsing a high frequency current at a rate between 100 and 500 milliseconds until an electric arc is established between electrodes and nozzle. The establishment of the arc depends upon the nature of the gases passing through the nozzle electrode area. Generally the arc is established between 0.5 and 5 seconds after commencement of pulsing.

Broadly, this invention also contemplates an automatic control scheme for accomplishing the purposes above, which comprises a timer means in association with a secondary gas flow regulator, a second timer in association with a current increase regulator, said timer means correlated to provide a final flow rate when the current is established at its final value.

This invention also contemplates a means for providing direct feedback and voltage control, which comprises a means for determining the current through the electric arc established in a plasma flame spraying gun, means in electrical association therewith to compensate for current variation by adjusting said current established in said circuit. Alternatively, means can be provided at fixed current to regulate the flow rate of a secondary gas in response to fluctuations in the voltage in the electric arc established in the nozzle of the plasma flame spraying gun.

BRIEF DESCRIPTION OF THE DRAWINGS

The invention can be more readily understood by reference to the annexed drawings, in which:

FIG. 1 is a chart showing the desired time sequence for automatic operation of a plasma flame spraying unit with argon primary gas;

FIG. 4 is a detail of the circuitry for the gas flow;

FIG. 6 shows the pulse-ignition system;

FIG. 8 shows the circuitry for the meter and current feedback shunt;

AUTOMATIC SEQUENTIAL OPERATION OF AN AUTOMATIC FLAME SPRAYING PROCESS

Figure 12:
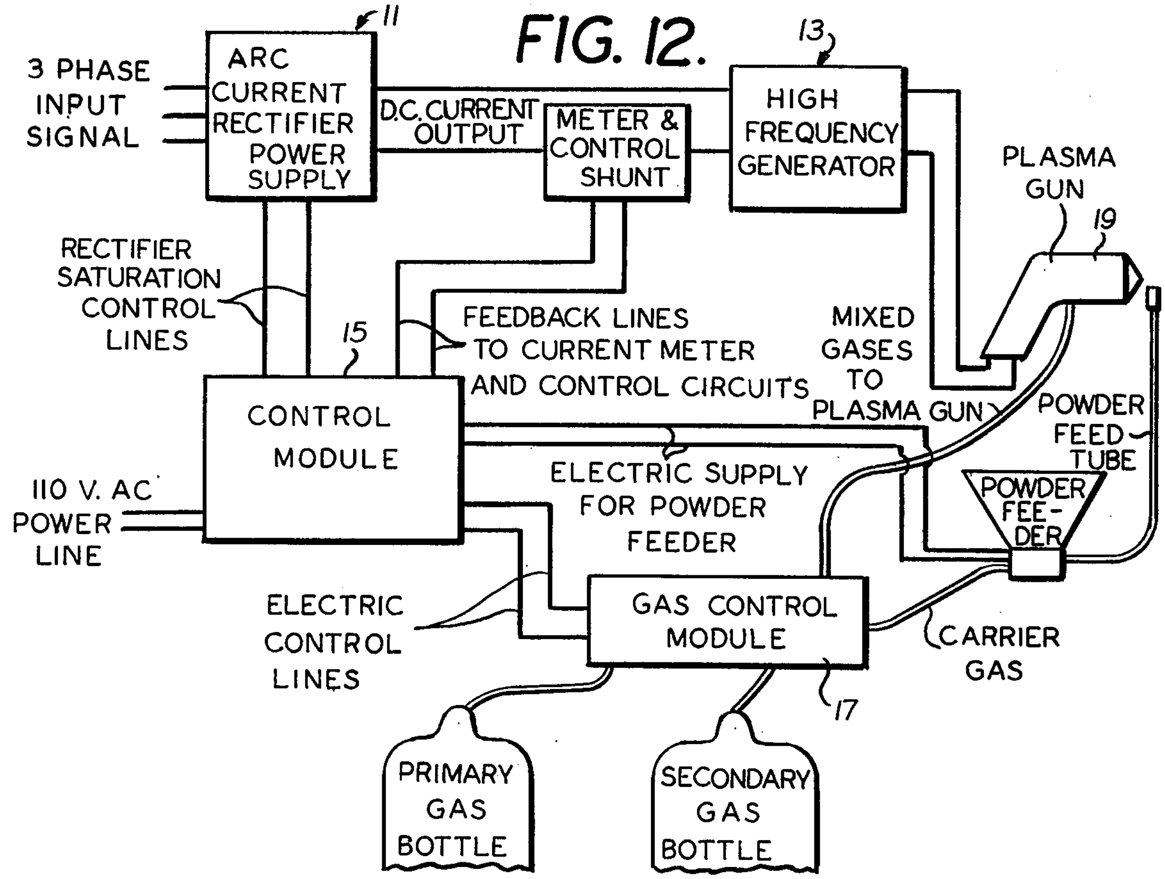
FIG. 12 is a block diagram of the automatic plasma system.

A typical plasma gas apparatus is shown in the FIG. 12. Power is supplied to the plasma flame spray gun 19 from an arc current rectifier shown at 11. A high frequency generator 13 is used to provide high voltage for initiating the arc. A control module 15 and gas module 17 are used to control the timing and flow rate of the plasma gas or gases, the timing and duration of the ignition voltage and the timing and value of plasma arc current.

FIG. 1 shows a desired or optimum automatic start-stop time sequence for the operation of the various parameters employed in a plasma flame spraying unit. The operation of such a unit, as broadly described in U.S. Pat. No. 2,960,594 to Thorpe, incorporated herein by reference, involves use of a cooling medium, at least one plasma gas and an arc maintained in the nozzle of the gun. In accordance with the preferred embodiment, pursuant to the invention herein disclosed, the cooling medium, suitably water, is turned on at point Zero. At a time thereafter, suitably several minutes, the electrical system and gas flow are initiated. The primary gas flow, suitably nitrogen or argon, and the DC voltage through the circuits of the electrical system are initiated. The primary gas flow will help to distribute the arc across a relatively broad area in the nozzle when once such an arc is established. Automatically, the ignition which creates the arc is effectuated at a period of time of at least 0.25, preferably 0.5 2.00 seconds after intiation of primary gas flow through the gun. This occurs at a low current setting to avoid electrode damage. Simultaneously therewith, in the case of argon primary gas, secondary gas flow and arc current increase are initiated to start to bring the arc up to full operational power level. If nitrogen is used, the primary gas commencement of secondary flow is delayed until ignition is stopped. The secondary gas flow substantially increases the voltage across the arc, and without any compensation in a standard power supply, this voltage increase would cause reduction of current. The secondary gas flow increase and the arc current increase are set such that they both achieve the final predetermined values with respect to each other within a period between 0 and 20, preferably less than 15, seconds, most preferably simultaneously. This is accomplished, in accordance with this invention, by providing a timer means associated with the secondary gas flow regulator and a second timing means associated with an arc current increase means. The respective timers are set such that the final secondary gas flow and arc current value are reached within the desired time window. The appropriate timing means and circuitry are shown in FIGS. 3 through 7. As the secondary gas flow increases, current decrease caused thereby is compensated proportionately by the current increase automatically effectuated by use of a current increase timer. A particularly desirable timer for this purpose is a proportional semiconductor control circuit which over a period of time allows progressively more current to pass therethrough and through the arc. Once the secondary gas flow across the electrodes is established at the predetermined full flow value, the arc current has achieved its desired final value. This final arc current is quite dependent upon the nature of the specific secondary gas. It can have any value between 100 and 1500 amps., preferably 250 and 1,000 amps. Final arc currents generally range at least 350 amps.

The secondary gas flow is dependent upon the nature of the gas and the desired temperatures of the plasma to be obtained. Generally speaking, the secondary gas is present in admixture with the primary gas in an amount between 1% and 97% by volume of the combined amounts of the gases. In practice, the amount of secondary gas tends to be between 3% and 45% by volume of the plasma gases passing across the arc.

Ignition pursuant to an embodiment of the invention, is accomplished utilizing a pulsing means which insures the creation of the arc across the electrodes. Such ignition is effected employing a high frequency generator, for example oscillating between 500 and 2,000 kilocycles at about 5 to 20 kilovolts. This high frequency is further pulsed at a rate of 10 to 1,000, and preferably 100 to 500, milliseconds. Pulsing occurs over a period of at least 0.5 seconds, preferably for a period between 1 and 5 seconds. Such pulsing has been found to insure that the arc is established at such time as the secondary gas has begun to flow over the electrodes. Furthermore, it insures the creation of the arc so as to allow the current across the arc to be increased in response to the addition of the secondary gas.

Generally speaking, after a period of between 2 and 20 seconds from the commencement of the energization of the DC voltage and the flow of the primary gas, the system is in full operating order. The secondary gas after such period of time is established at the full predetermined flow. It should be noted that the secondary gas is increased gradually, whereas the primary gas can be passed, in most instances, through the nozzle initially at full flow. This is due to the fact that the primary gas flow does not create any particular problems insofar as constriction of the electric arc is concerned.

The apparatus at such a condition is ready to be used. Powder such as any known flame spray powders, including metals, ceramics or plastics, can be fed through the front of the nozzle and the plasma gas at the excited energy state will have attained the desired temperature sufficient to heat such powder so that it can create an excellent adherent bond with a relatively cool workpiece disposed in facing relationship to the mouth of the nozzle.

It is desired in the automatic operation of the plasma flame spraying unit that the shut-down be performed automatically, generally in accordance with the time sequence depicted in FIG. 1. Referring again to FIG. 1, shut-down is accomplished by initially shutting off the secondary gas flow and compensatingly reducing the arc current. In this instance, the arc current is reduced more gradually than the reduction for the secondary gas flow. The timing means is set to gradually effect secondary gas flow reduction, such that secondary gas shut-off occurs within a period between 0.5 and 15 seconds. The arc current decline generally occurs between 1 and 20 seconds after commencement of shut-down. Simultaneous with reduction of the arc current to zero, the voltage and primary gas flow are automatically shut off.

Figure 2:
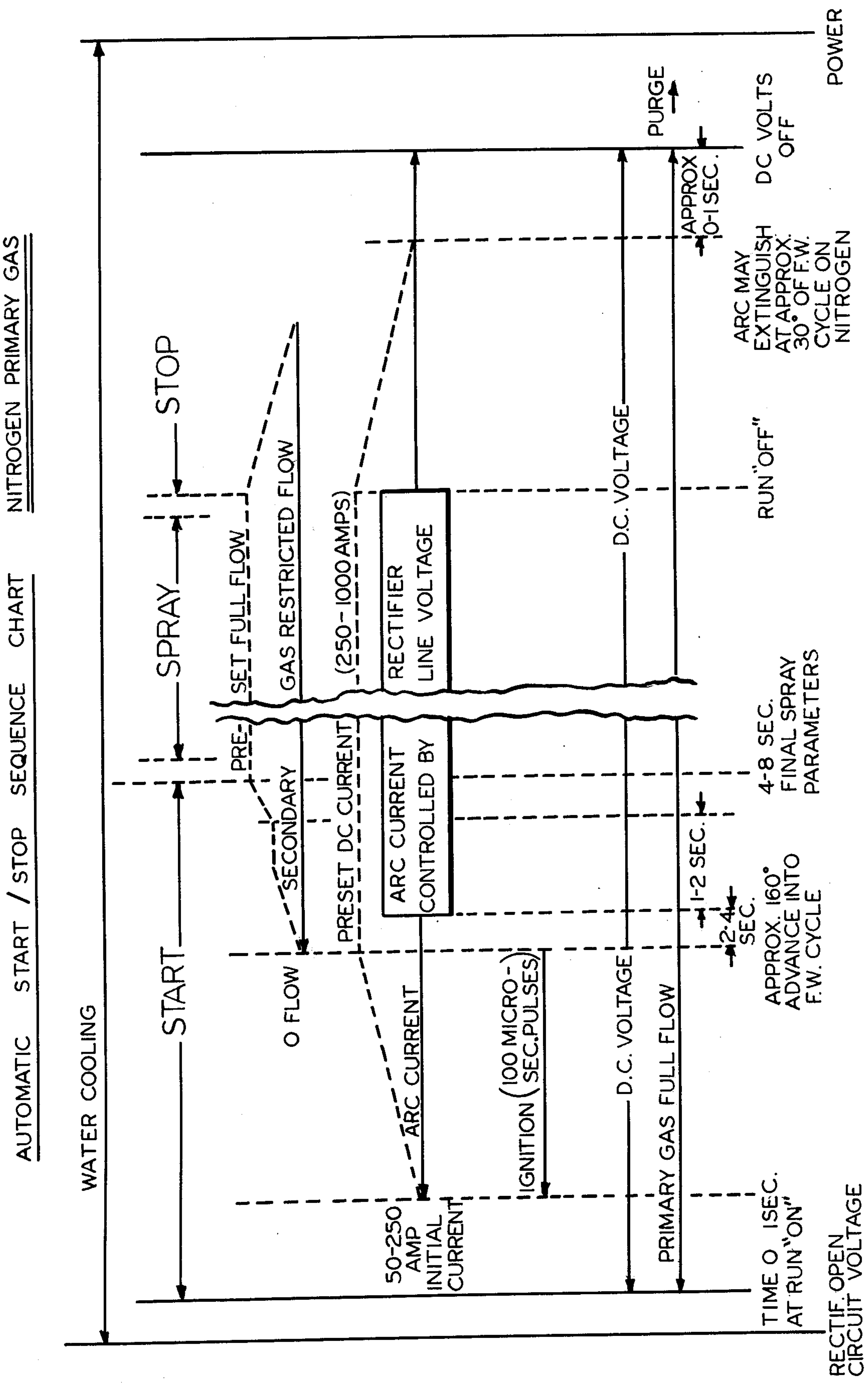
FIG. 2 is a chart similar to FIG. 1 but with nitrogen primary gas.

The above-described time sequence has been shown for a system in which argon is the primary gas. It should be understood that the specific time sequence can vary depending upon the nature of the primary gas. For instance, when nigrogen is used as the primary gas, the arc current increase begins approximately at the same time as commencement of ignition. Secondary gas flow can start appreciably after commencement of arc current increase. Generally speaking, in a nitrogen primary gas system, commencement of secondary gas flow can occur up to about ten seconds after commencement of arc current increase. However, it should be understood that in such a system, the secondary gas flow start-up is geared to ignition shut-off. A suitable system is shown in FIG. 2 which sets forth the time sequence for a nitrogen primary gas system. The balance of the system from a time sequence point of view is generally along the lines of an argon primary gas system.

Figure 13:
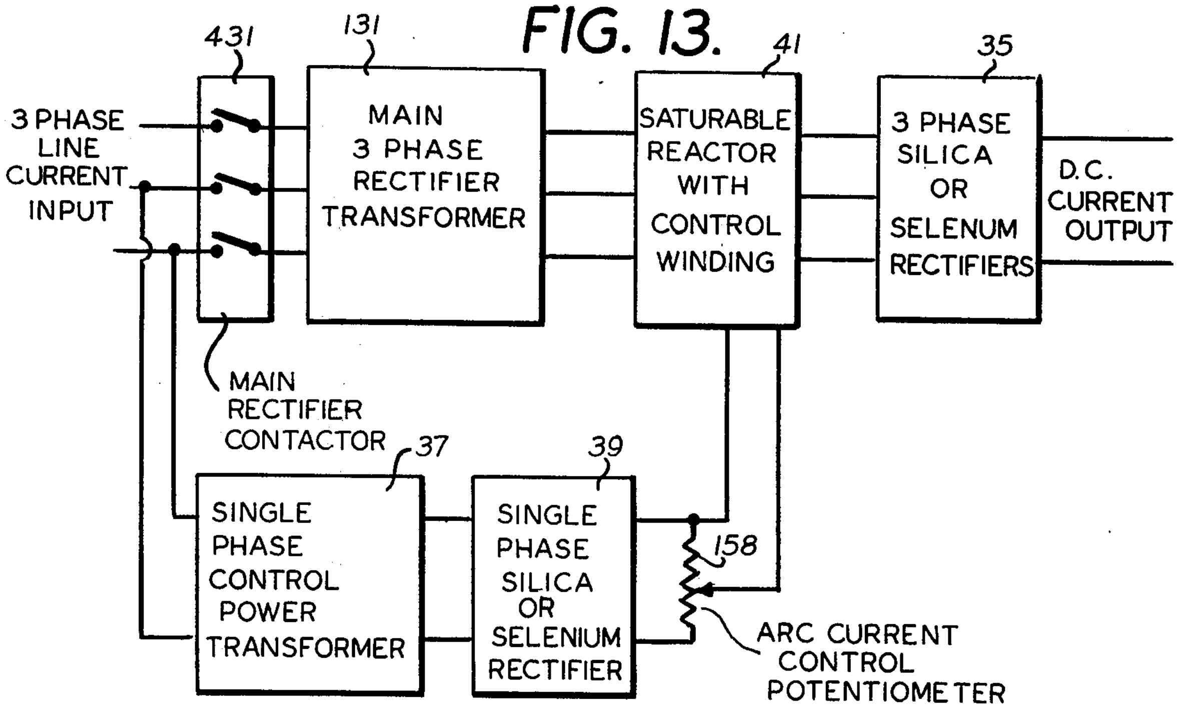
FIG. 13 is a block diagram of the arc current rectifier power supply.

In a plasma flame spraying unit the arc current is adjusted for various values by the circuitry described in FIG. 13. In the standard plasma system the input power line can be either single, two or three phase current, and this enters the main transformer 31. This is usually an isolation transformer. This voltage can either remain the same as the line, be stepped up or stepped down before it enters the saturable reactor 41. This saturable reactor 41 operates by controlling the flow of current to the silicon or selium rectifier 35. This is done by winding an accessory or control winding on the same iron core as the AC winding. By passing a DC current through this winding, the amount of AC current transferred from input to output is modified. This provides a convenient current control for final plasma arc current. In other words, by varying the saturable reactor DC winding current from approximately ½ to 5 amps. the final plasma arc current can be varied from approximately 50 to 1,000 amps. The DC control current is obtained by using a small single phase control power transformer shown at 37. This AC voltage is rectified at 39. This DC voltage is controlled in potentiometer 158 and provides a smooth control of final plasma gun arc current. The control of final arc current in this invention is obtained automatically by placing a semiconductor silicon control rectifier (SCR) in the circuit just described between the potentiometer 158 and the DC control winding in the saturable reactor 41. An SCR is a semiconductor device that can control the pulsating current through it like a switch, operating at a very fast speed. The gate terminal closes the switch and pulsating or alternating current turns it off. Therefore, portions of a cycle or a number of complete cycles of current can be passed or inhibited depnding on the pulse signal at the gate terminal. The firing angle or pass current control of the SCR is controlled by high current pulses generated by a two transistor circuit described in another section and connected to the gate terminal of the SCR.

Figure 3:
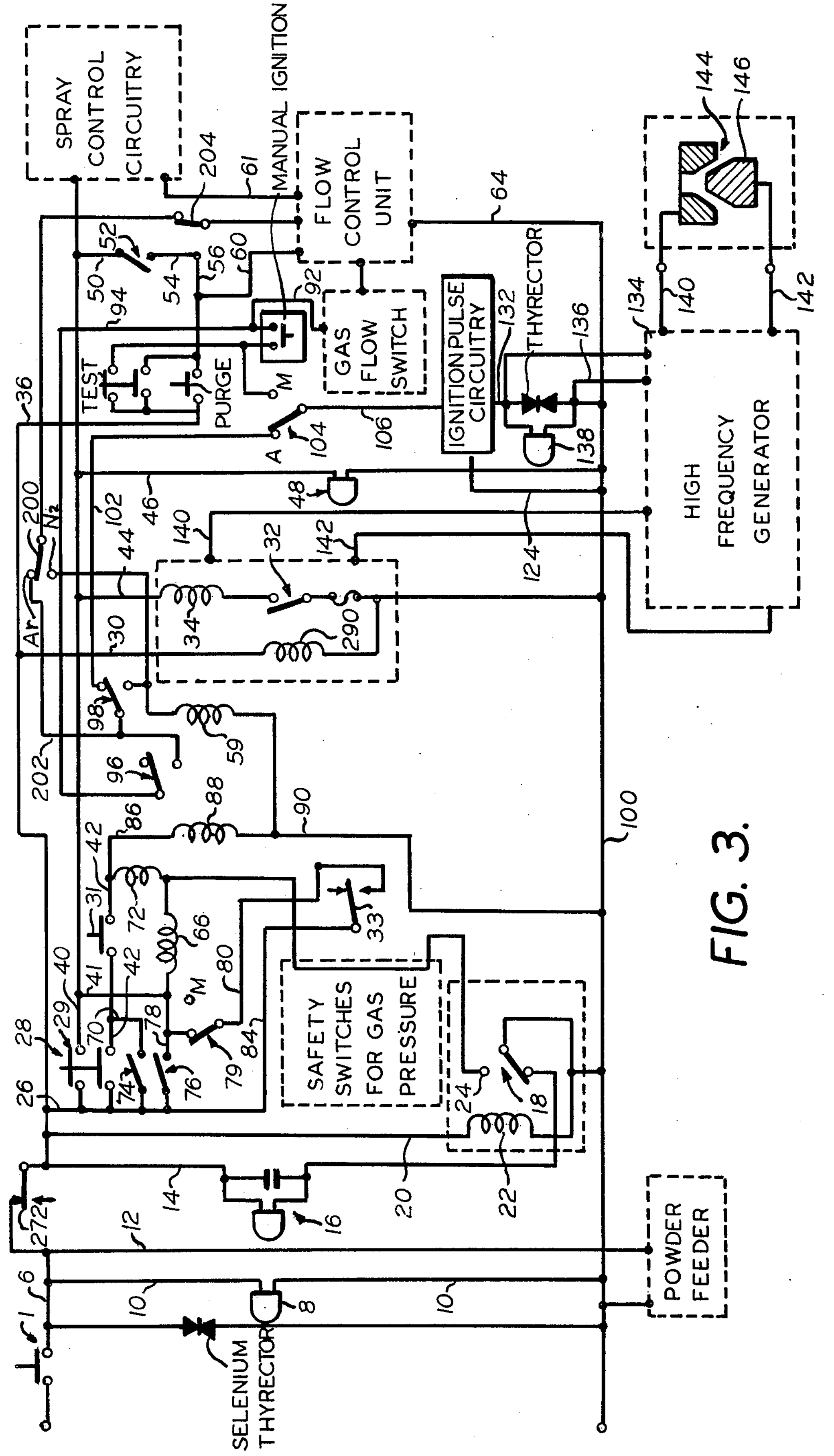
FIG. 3 is an electrical diagram of the over-all circuitry of a plasma flame spraying unit. It should be understood that relay contacts 272 are used only in the closed-loop embodiments of this invention.

Referring to FIG. 3, "on" switch 1 is positioned such that when the switch is closed, current passes into line 6. There is provided an emergency switch at switch 1 for safety purposes. Current flows through line 6 into line 10 equipped with a "power on" light 8. Current also flows into line 12 which supplies current to a powder feeder shown diagrammatically. Simultaneously therewith, current flows into line 14 and flows through line 14 through "water off" indicator 16 and continues to cooling water pressure switch 18 shown in the normally closed position. Simultaneously therewith, current enters line 20 and passes through water cooling solenoid 22 actuating switch 18, in turn, turning off the "water off" light or indicator 16. When switch 18 is energized it makes contact with lead 24, in turn putting all of the gas safety switches (activated by excessively low or high pressure or flow rate) into the circuit. Simultaneously with these operations, current flows into line 26 thereby setting the "run on" circuit shown generally by reference character 28. When current flows through line 6, it also flows into line 30, which turns on the auxiliary relay coil 290 and the rectifier power supply. A switch from the fan motor closes the centrifugal switch 32, such that when power passes from the "run on" line, the main contactor coil closes. The main contactor coil is given reference numeral 34. The main contactor coil only closes when current passes through the "run on" circuit.

Referring again to line 6, current passes through line 6 into line 36 which sets up the circuit for either a test or a purge. The test and purge conditions provided in the system are a desirable embodiment, so that the overall circuitry can apply to an automatic system as well as to a manual system. In automatic operation the test and purge conditions are not used.

Referring now to the "run on" circuit, there is provided a switch 29 which when engaged or depressed allows current to pass from line 6 via line 26 into lines 40 and 42. When current passes through line 40 it passes thence through line 44 which allows the main contactor coil 34 to be closed as above described. This instant the voltage is turned on as shown in FIGS. 1 and 2.

Current also passes into line 46 and passes through a run pilot indicator 48 and thence into the return indicating the status of the system. Current continues through line 40 and passes into line 50 containing a relay contact 52. At the same time current is caused to pass through line 42 toward the relay coil 66, closing relay contact 52 enabling current to pass down through line 54 to line 56 and thence into line 60, turning on the primary gas flow. Referring to FIG. 4, current in line 60 actuates the primary gas solenoid valve 62 which opens the primary gas flow and establishes a full flow or other predetermined primary gas flow through the system. Current is returned through line 64 into return line 100. It can be seen by reference to FIGS. 1 and 2 that at this point the primary gas flow and DC voltage are established at the same time. The system is established at a point where it is about ready for the ignition to create the electric arc in the plasma gun and to commence secondary gas flow and arc current increase.

The current in line 41 energizes run relay coil 66 which closes the relay contact 52 as above described. Current is also caused to pass through line 42 when the run on switch 29 is depressed. The current continues in line 42 through normally closed switch 31 to the transfer relay coil 72 which is energized and causes the relay contact 74 to close. Additionally, the energization of the transfer relay coil 72 closes the contact of relay 76 in line 78. When 76 is closed the system is energized independently of the position of the switch 29. Current passes through line 44 independently of the "run on" switch and line 44 feeds the relay coil 34 which hold the main contact (shown in FIG. 13) in the arc current rectifier power supply when the power on switch 29 is released.

In FIG. 3 as shown, the switch 79 is in the automatic mode. As indicated above, the system can be operated manually, in which case it is not desired to have current pass through line 80. Hence, when operating in a manual mode, switch 79 is removed from the automatic to the manual position indicated by the letter M on the drawing.

A relay coil .35 in SCR control circuit 210 shown in FIG. 5 closes contact 33 (FIG. 3) which holds the power supply in the circuit until the arc current is later declined during shut-down to a point where the rectifier and primary gas flow can be shut off. The current passes through line 84 and into the relay contact 33 through line 80, into line 78 and thence into line 40.

Current continues in line 42 and passes into line 86 and enters a time delay relay coil 88 set to close contact 96 in about one second. Current to 96 is supplied from the gas flow switch (only shown schematically) and lines 92 and 94, to insure that primary gas is flowing before and during ignition. Closing 96 starts the ignition circuitry and current is returned via line 136 and line 100. The contacts 96 close, feeding current through the normally closed relay contact 98 and through the manual-automatic switch 104 shown in the automatic mode. This current continues through line 106 and passes through a relay contact 108, now shown in FIG. 6. This continues through line 110 and through diode 112, through resistor 114 and through a capacitor 116 at the same time passing through ignition relay 118. Current is returned to line 120 to line 122, in turn feeding line 124 shown in FIG. 3, in turn returning the current to the source via line 100. The coil 118 pulses the current through contacts 108, 109. Contacts 108 and 109 are shown parallel to one another and break up the current into pulses of 100 to 500 milliseconds. The pulsed current passing through line 132 as shown in FIG. 3 which feeds the pulsed current into a high frequency generator shown generally by reference numeral 134. Current returns from the high frequency generator via line 136 and into line 100. Ignition pilot light 138 can be provided indicating the "ignition-on" status, by the current provided by the circuitry depicted in FIG. 6.

Figure 5:
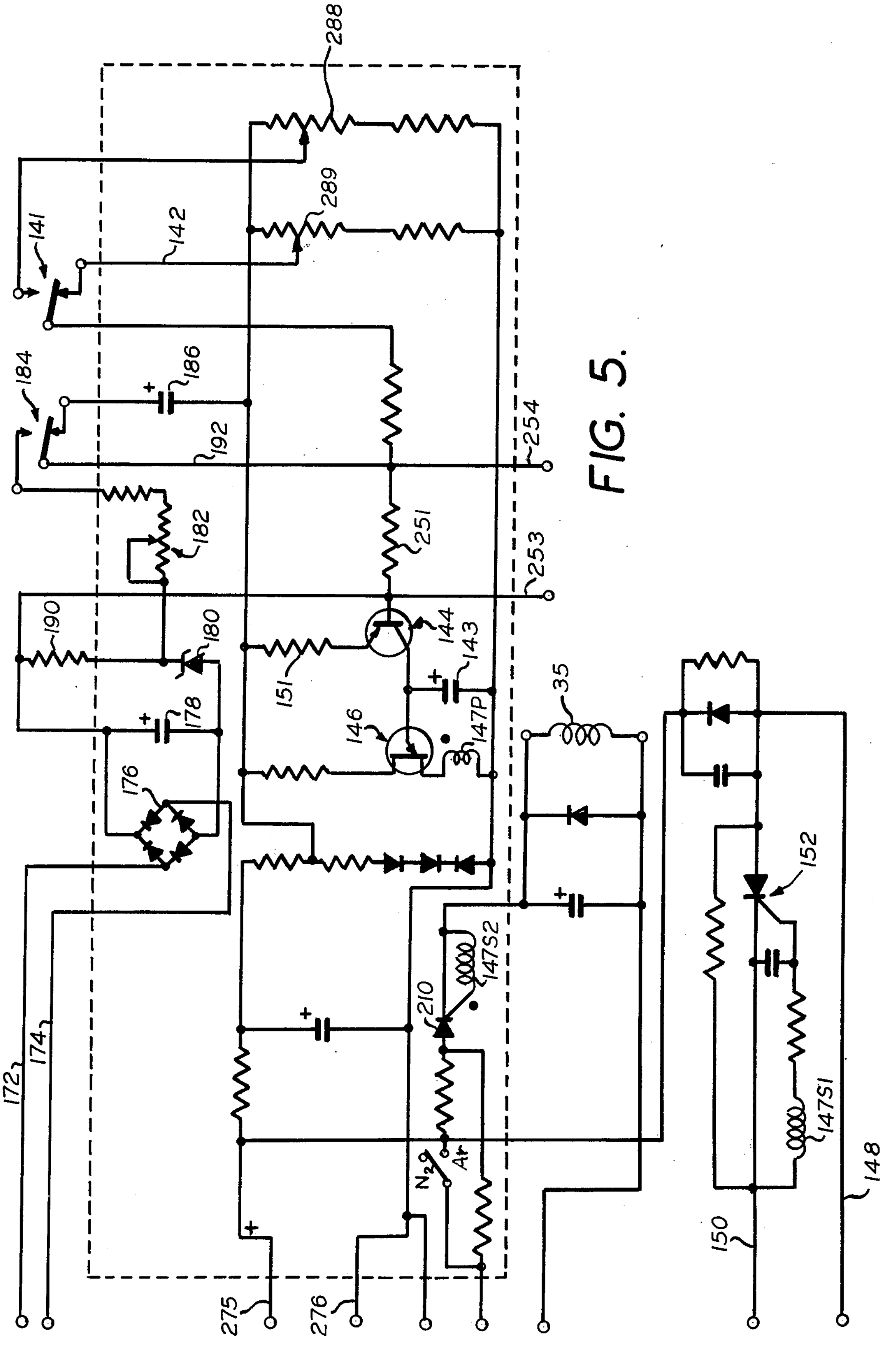
FIG. 5 is an electrical diagram of the circuitry of the SCR control.

When the contacts for relay 96 are closed, simultaneously therewith contacts 141 shown on FIG. 5 are closed due to the actuation of the relay 88. The purpose of this action and the circuit depicted in FIG. 5 is to begin the arc current increase simultaneously with, in the case of an argon primary gas system, the commencement of the secondary gas flow. In this system, when contacts 141 are closed, closure of the contacts at 141 biases line 142 in response to the circuitry containing transistors 144 and 146. The purpose of this assembly is to enable the system to eventually control the amperage up to the preset final arc current desired, i.e., in the range of 150 – 1,000 amps.

The two-transistor circuit in FIG. 5 is a typical SCR pulse transformer firing circuit. The off-bias circuit consists of relay contact 141, line 142, and off-bias potentiometer resistor 289. When contact 141 is in the position shown, the transistor circuit maintains the SCR in an idle condition that feeds a small amount of current into the rectifier saturation winding to keep it at a standby condition. When the "run" button is pushed the relay contact 141 is transferred to potentiometer resistor 288. This potentiometer connects the "on" bias to the base circuit of the transisitor. A capacitor 186 controlled by relay contacts 184 provides a slow rate of change for the transistor base current from the off bias condition to the on bias condition during start up and the same slow rate of change during shut down. By choosing the value of this capacitor, the time to reach final conduction of arc current can be established. For example, the capacitor chosen is a 500 MFD (microfarad) unit which gives a start up and shut down time of about 6 seconds. This capacitor is in the circuit only during start up and shut down. The "on-bias" current flows through resistor 251 and, in the closed loop option (to be described later herein), is modified by the feedback current flowing through this resistor from the shunt amplifier connection to wires 253 and 254 in FIG. 9 which are, in turn, connected across the shunt 250 in FIG. 8. If the feedback signal is lower than that called for by potentiometer 288 (transistor "on-bias" setting), the transistor conducts more heavily passing a higher current through resistor 151 and charging oscillator timing capacitor 143 more rapidly. This causes the unijunction transistor 146 to conduct earlier in the half wave period of the power supply waveform at wire 275 and 276. A pulse appears in the primary winding 147P of the pulse transformer at this instant. This pulse is coupled to the pulse transformer secondary windings 147 S1 and 147 S2, firing both SCR's 210 and 152. As the transistor 144 passes more or less current, the SCR's fire either earlier or later in the period of the waveform thereby passing more or less current to the circuits they are in. The SCR 152 controls the saturation current and thereby the final plasma arc current. The SCR 210 controls the current relay coil 35 thereby synchronizing its closure to a point during the current advance cycle. In like manner, during shut down, this relay coil 35 will cause the relay to open at a fixed point in the current retard part of the cycle.

Figure 7:
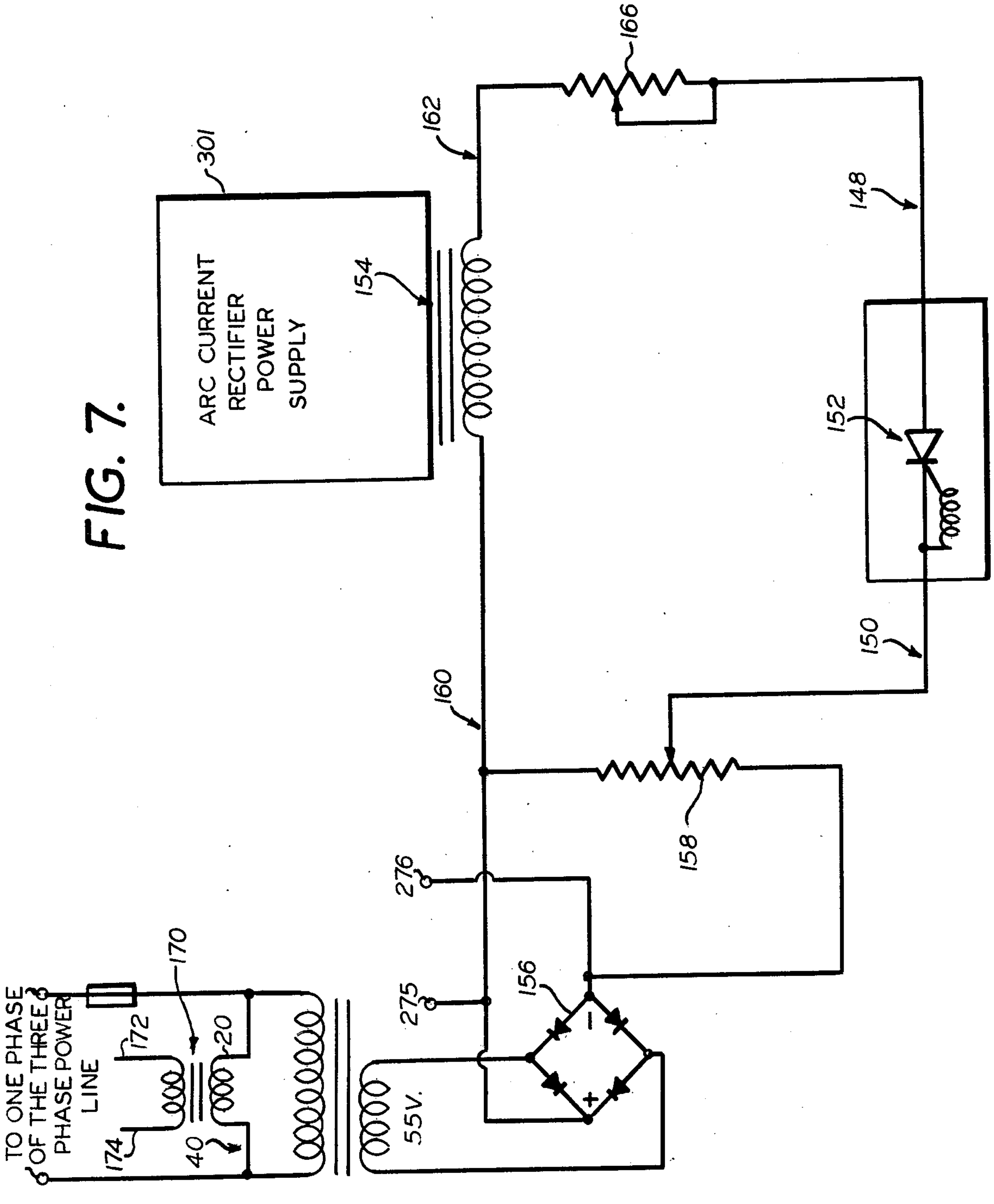
FIG. 7 shows the control circuitry in the arc current rectifier power supply for the open loop system.

FIG. 7 shows a saturable reactor controlled by a silicon control rectifier (SCR). The arc current rectifier power supply of known type designated generally by 301 is designed such that for every one amp of current sent into the saturation winding 154, approximately 100 amps DC is delivered to the plasma gun load. The circuitry is such that the saturation current in this rectifier is set for a predetermined final value by the variable resistors 166 and 158. A silicon control rectifier (SCR) 152 and the resistors 166 are inserted between the saturation winding 154 and the final arc current control setting resistor 158. The SCR 152 modifies the saturation current in 154 adjusted on the arc current control 158 so that the SCR will gradually increase or decrease the arc current as shown in FIG. 1.

FIG. 7 shows the single phase transformer that feeds the bridge rectifier circuit 156 with about 55 volts to provide the saturation control current. These 55 volts also provide the power for the two-transistor circuit in FIG. 5 through lines 275 and 276. The positive line from the bridge rectifier 160 feeds the positive side of the saturation winding 154 in the rectifier, as shown in FIG. 7. The output of the saturation winding line 162 connects to 166, a fine current calibration control of the saturation winding. Variable resistor 158 is an arc current control which sets the final limit of arc current in the rectifier. Control 166 feeds the SCR via line 148. Current through SCR 152 is controlled by the variable resistor 158 which is the means for arc current control setting. This is accomplished by selectively firing the SCR 152.

During starting, the arc current is increased by gradually advancing the SCR 152 firing angle into full conduction into the saturation winding 154 of the power supply rectifier. The transistors 144 and 146 (FIG. 5) control this firing angle of the SCR 152. Referring to FIG. 1, when the arc current has reached an advanced (but not quite final) value, the current has also advanced in relay coil 35 of FIG. 5 (controlled by SCR 210 as previously described with respect to the two transistor circuit 144 and 146 operation) to a point where contacts 98 in FIG. 3 close. This opens the ignition circuit and transfers current to the relay coil 59. This relay 59 controls contact 184 in FIG. 5 which removes the slow start and retard function of the transistor amplifier 144 and 146 through capacitor 186. This relay contact also completes the AC line voltage compensation of the arc current rectifier power supply.

When nitrogen is being used as the primary gas, thhe secondary gas is introduced at the same time that contacts 98 close. This is done to insure that a stable arc is present before secondary gas is introduced. Shown in FIG. 1 for argon as the primary gas, secondary gas starts to flow as the arc current starts to advance. Therefore, the argon-nitrogen switch 200 is shown in the argon position. When switch 200 is in the argon position, the supply line is 202 which feeds voltage to switch 200 and continues to switch position 204 (the manual-automatic mode switch) which energizes secondary gas solenoid valve 206 shown on FIG. 4 and starts secondary gas flow into the secondary gas reservoir. Return line for solenoid 206 returns through the line 64 to line 100 which is the AC return.

The means by which the secondary gas flow reaches its final desired value differs from that by which the arc current reaches its final desired value. In one embodiment of this invention, shown diagrammatically in FIG. 15, a reservoir means 351 is utilized by which the gas builds up at a predetermined rate in a reservoir (i.e., enclosed chamber) while yet feeding increasing quantities of the gas to and through the arc maintained within the plasma flame spraying unit. The reservoir 351 has a smaller opening at the outlet valve 353 than at the inlet valve 355, causing a flow out of the reservoir. By preadjusting the size of these openings, the time required for it to fill can be varied. In this invention the size of the reservoir is approximately 90 cubic inches in volume.

Figure 15:
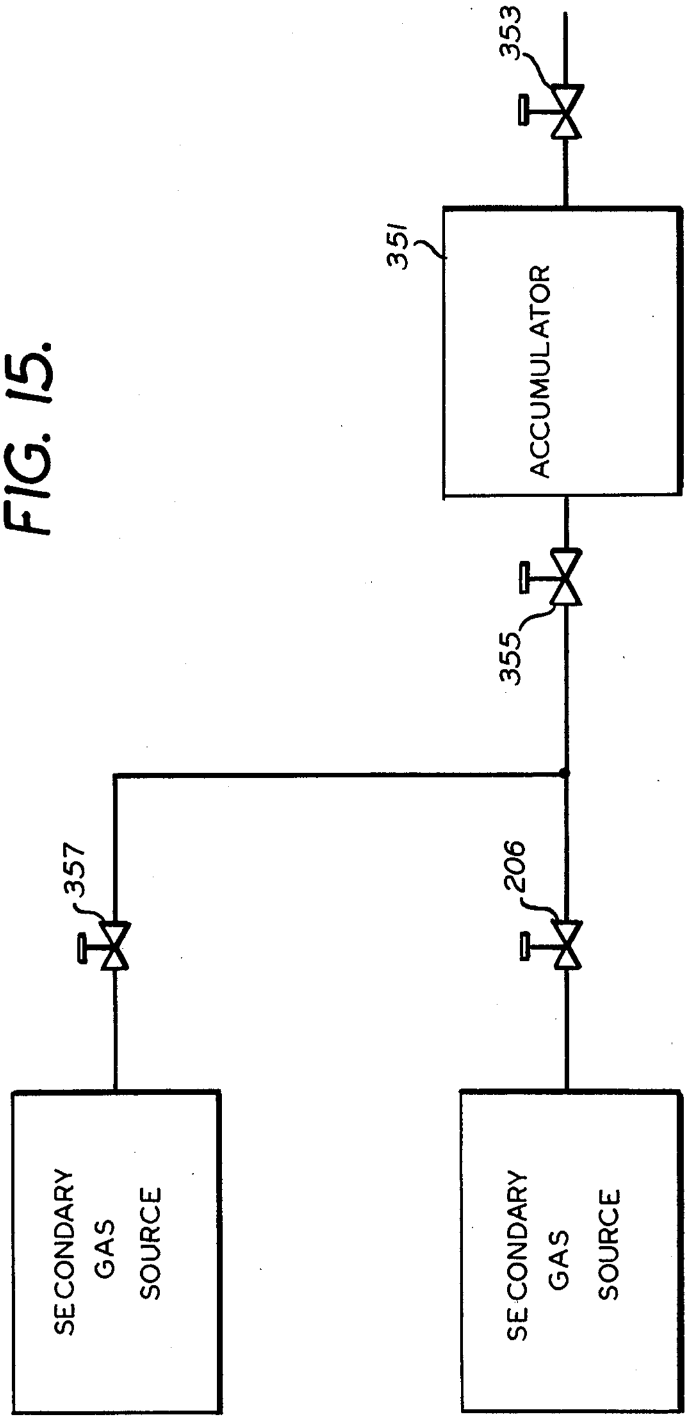
FIG. 15 is a schematic drawing of the accumulator used to meter secondary gas flow to the plasma flame spraying gun.

In order to obtain a more linear flow in relation to time of secondary gas, the filling of the reservoir is controlled by two secondary gas solenoid valves 206 and 357 as shown in FIG. 4 and FIG. 15. The restricted flow valve 206 is opened first. After about a one-second delay, the solid state relay opens the full flow secondary gas solenoid valve 357. In the closed loop system described later, only the full flow secondary gas solenoid valve is preferred. When the reservoir is entirely filled, the flow of gas is full through the arc which is timed by the size of the reservoir and gas pressure to correspond with the maintenance of the desired final level for the arc current. It should be understood in this invention that it is not absolutely critical that the secondary gas full flow correspond simultaneously with the establishment of a final arc current. Preferably, these values should reach their desired predetermined value in a period of time between 0 and 5 seconds of one another.

A single valve will cause an exponential timeflow increase and curve of the secondary gas.

If flows other than exponential are desired, such as approaching a linear curve, a plurality of valves from the secondary gas sources can be used in which case the valves have different constrictions. A first valve from a first secondary gas source can open followed by a time-interval before which the second valve is opened from its secondary gas source. This second valve will have a different constriction. Gas from the two valves mixes upstream of an accumulator designed to regulate ultimate flow increase of the secondary gas through the gun. The accumulator functions as a timer in allowing gradual increase of secondary gas flow over a predetermined period of time. The period of time is determined by the constriction of the accumulator itself and the gas flow to the accumulator.

At this point, the secondary gas flow is established at its final desired flow, preferably simultaneously with the establishment of the desired arc current. Substantially immediately thereafter, the plasma gas mixture attains its desired temperature and the arc is distributed over a broad area toward the nozzle of the plasma flame spraying unit. The plasma gun is ready for operation.

Referring to FIGS. 5 and 7 for the open loop system, correction is provided for a drop in rectifier three-phase line voltage. Normally, this line voltage drop would cause a fall-off in plasma arc current. Line compensation is accomplished by picking off or sampling rectifier 3-phase line voltage through isolation transformer 170 shown in FIG. 7. This varying line voltage is delivered on lines 172 and 174 in FIG. 5 to the full wave bridge rectifier 176 and filter capacitor 178. The varying portion of the DC is picked off across resistor 190. Zener diode 180 eliminates the constant value of this DC voltage and delivers the varying part of this voltage to variable resistor 182 and transistor base resistor 251, which changes the control signal on transistor 144 and modifies the firing angle of SCR 152 to correct arc current for line voltage fluctuations.

Operation of the plasma spraying unit at this point is easy. The powder feeder contains the powder to be sprayed. When it is desired to spray, the spray control circuitry depicted in FIG. 3 is energized in the usual way such as by a switch or trigger, whereby the powder is metered and entrained in a carrier gas to the mouth of the nozzle where it is placed in a thermal state and propelled under conditions of extreme heat toward the workpiece disposed proximate the orifice of the nozzle.

When the unit or workpiece is sprayed to the desired level, shutdown is begun. Referring to FIGS. 1 and 2, it can be seen that shutdown is accomplished desirably by initially terminating gradually the second gas flow. The DC current is also decreased, preferably commencing at the same time as decrease of the secondary gas flow. However, the arc current is set to reach minimum level and at such time it is appropriate to turn off the DC voltage and the primary gas flow. Essentially shutdown of the operation is accomplished by shutting off the spray control which terminates the feed of the spray powder and any carrier gas flow. This is followed by depressing, i.e., opening, the run-off switch 31, which in turn shuts off the supply of the secondary gas flow. Because the secondary gas flow ceases, the accumulation or reservoir chamber discussed above bleeds down to a final secondary gas flow of zero. This occurs over a period of time in accordance with the sequence depicted in FIG. 1. At such time the DC arc current begins to drop gradually, whereas relays 88, 72 and 59 are de-energized and contacts 141, 96, 74, 76, and 184 have been opened which cuts in timing capacitor 186 and the off-bias network shown at 141 in FIG. 5. This automatically gradually decreases the arc current over a period of time controlled by transistors 144 and 146 and, through transformer 147, controlling the SCR 152 as shown in the circuit diagram of FIGS. 5 and 7. Simultaneously SCR 210 starts decreasing the current through relay coil 35 since this semiconductor is also controlled through transformer 147 by transistors 144 and 146. When the arc current reduces to a level of about 50 to 200 amps, dependent principally upon the primary gas, the coil 35 in FIG. 5 is de-energized by the decrease in current through SCR 210. The relay contact of coil 35 shown as 33 opens. This in turn opens the rectifier power supply at relay coil 34 and opens relay contact 52 (FIG. 3) cutting off the primary gas flow. In the case where the primary gas is nitrogen, the flame arc is usually extinguished before the rectifier power supply opens since this gas cannot sustain ionization at very low arc currents.

Figure 9:
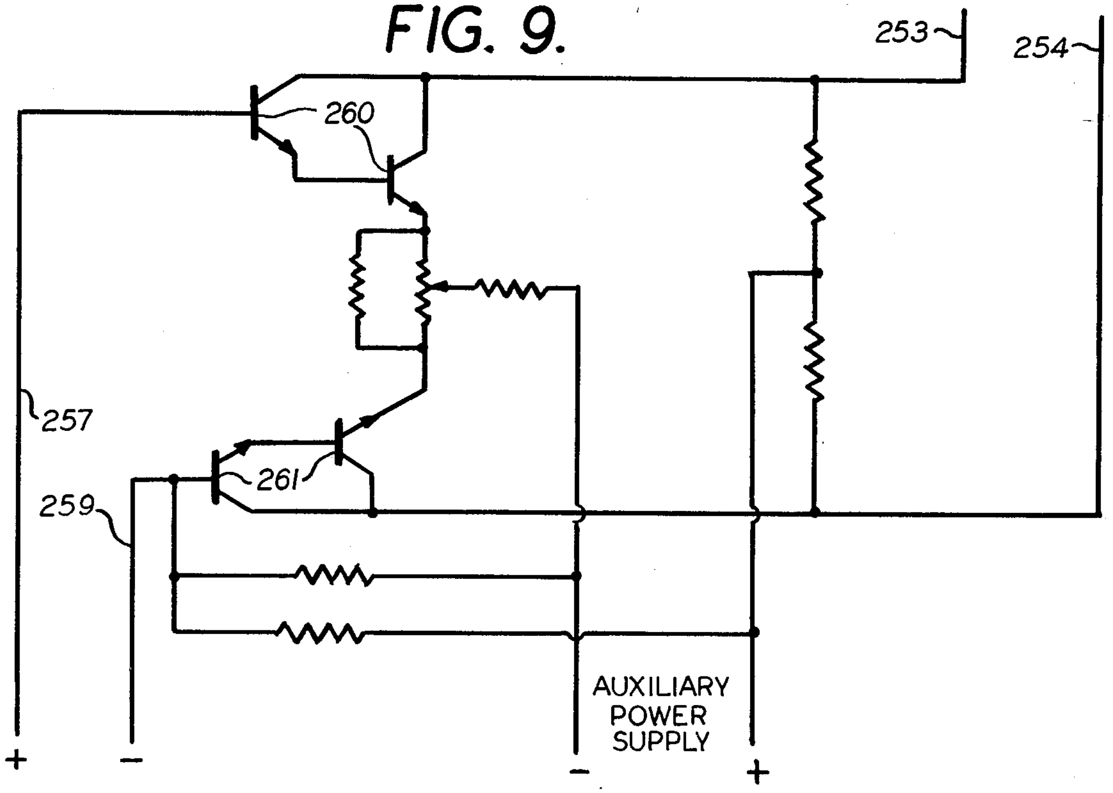
FIG. 9 shows the amplifier circuitry used to control the transistor amplifier.
Figure 14:
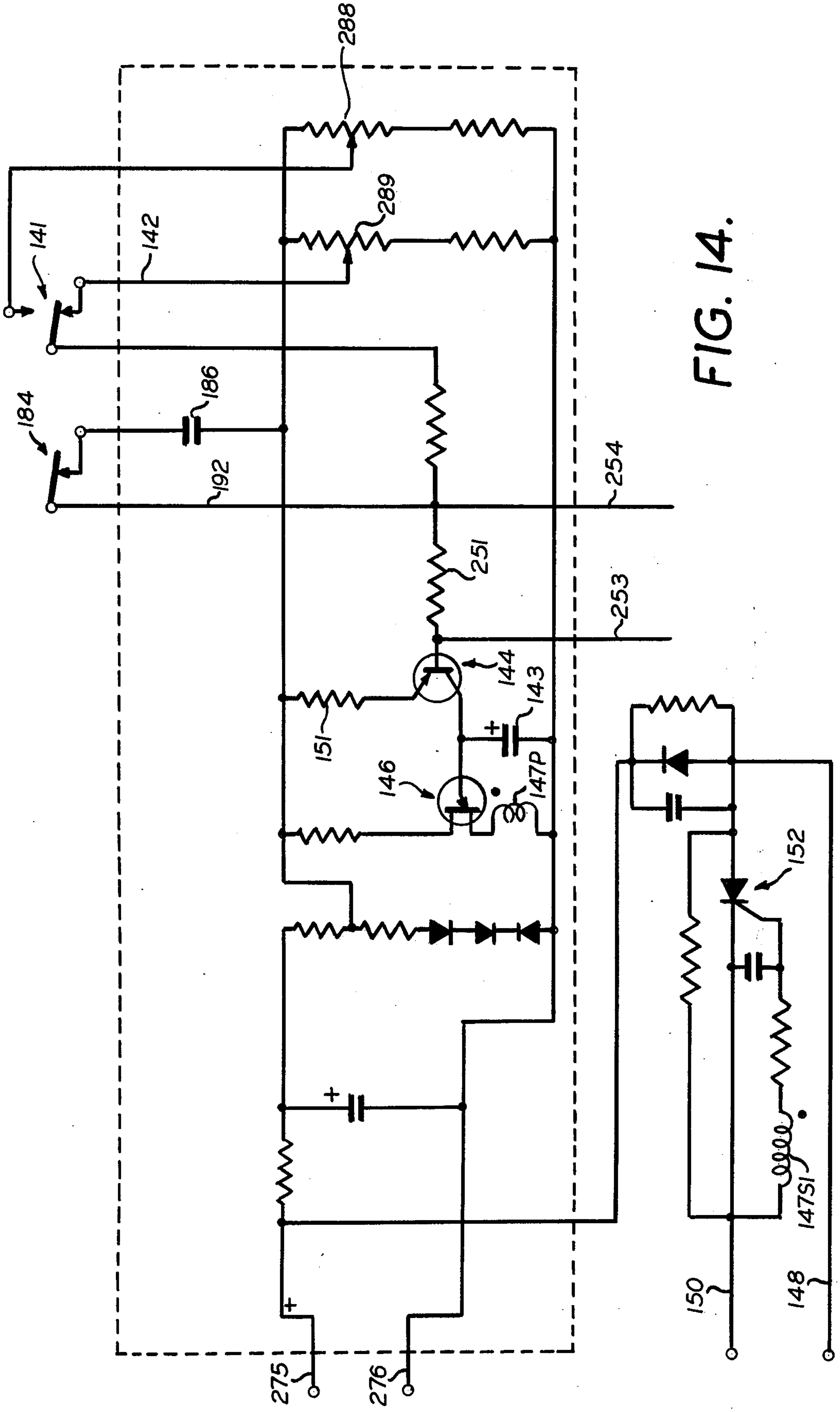
FIG. 14 is a schematic diagram of the circuitry of a closed loop system for regulating arc current conditions responsive to conditions in the plasma gun.

In a closed loop system, the circuitry of FIG. 14 is similar to FIG. 5 with the exception that the feedback signal is supplied by a signal picked off the plasma flame gun high current power cables. This signal can result from a high current shunt 250 connected in series with these cables as shown in FIG. 8. The signal from the shunt is connected to lines 257 and 259 and, referring to FIG. 9, is amplified in the transistor circuits 260 and 261. This signal is connected by lines 253 and 254 to resistor 251 (FIG. 5) in a silicon control rectifier firing circuit. The signal in this resistor changes the bias conditions on the transistors 144 and 146, thereby changing the firing angle of the SCR 152 to advance or retard the current in the saturation winding of the rectifier power supply.

Alternatively, this feedback signal can be picked off the plasma gun power cables by using a Hall Effect device detecting a magnetic field near the cables. The Hall Element is mounted in a holder mechanically attached to one of these gun cables. The Hall Elements are made in a variety of materials and can be purchased commercially. The Hall voltage output signal is applied to the circuit shown in FIG. 8 in the same manner as the signal from the current shunt is applied. An electro-optical device such as the Raysostor, manufactured by Raytheon, or the Photon-Coupler, made by General Electric, can also be used for the same purpose. These devices use the feedback signal from the shunt through an amplifier to vary a light source which is detected by a photocell or phototransistor and thereby changes the bias condition on the transistors 144 and 146.

Figure 10:
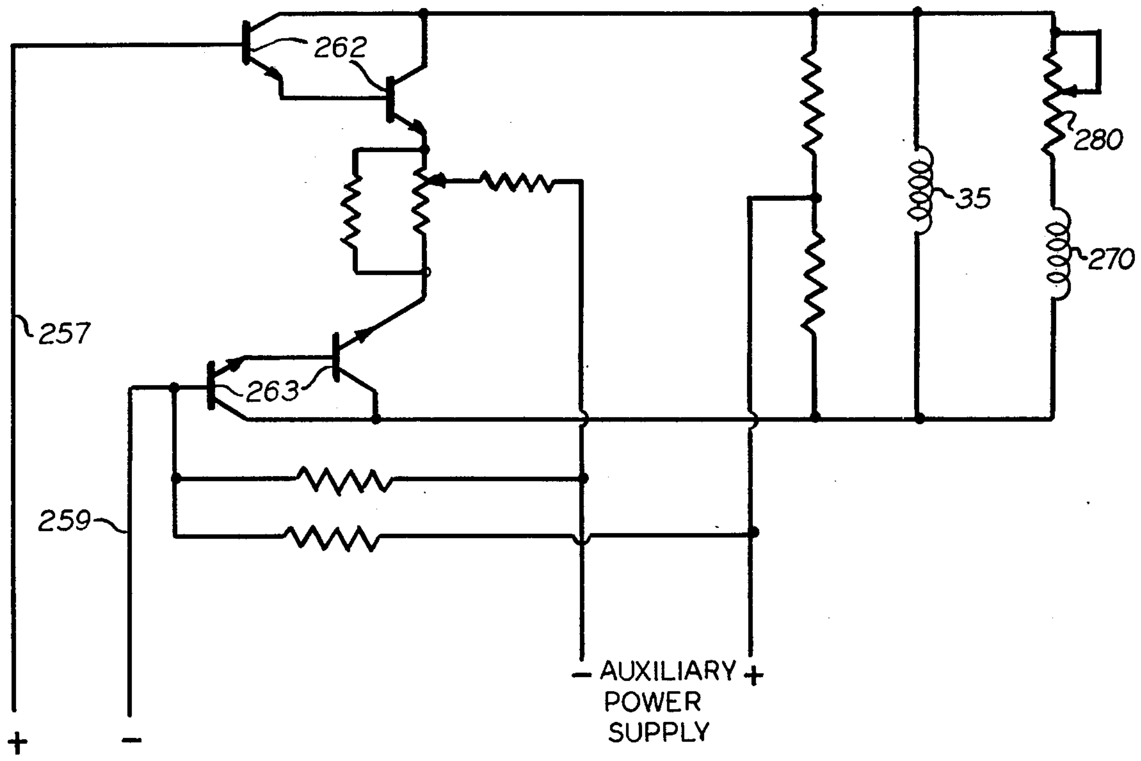
FIG. 10 shows the amplifier circuitry used to control the relay 35 and the overcurrent control relay.

In this closed loop system, the relay coil 35 is controlled by a second amplifier 262 and 263 shown in FIG. 10, replacing the SCR 210 circuitry of FIG. 5.

The input to this amplifier is also connected to the shunt 250 shown in FIG. 8. When the arc current has been increased to 200 to 400 amps. this relay 35 is energized by contact 33 and holds the rectifier power supply in the circuit until shut-down when the arc current drops to a point where the rectifier and primary gas flow can be shut off. It also turns off the ignition circuit and in the nitrogen mode controls the flow of secondary gas as in the open loop system. Also in this amplifier is a variable resistor 280 and a relay coil 270. This relay is an overcurrent protection: in the event that arc current goes higher than desired, this relay is adjustable by resistor 280 and can be set to turn the system gas flow and arc current off with relay contacts 272 in FIG. 3 for the closed loop system.

Figure 11:
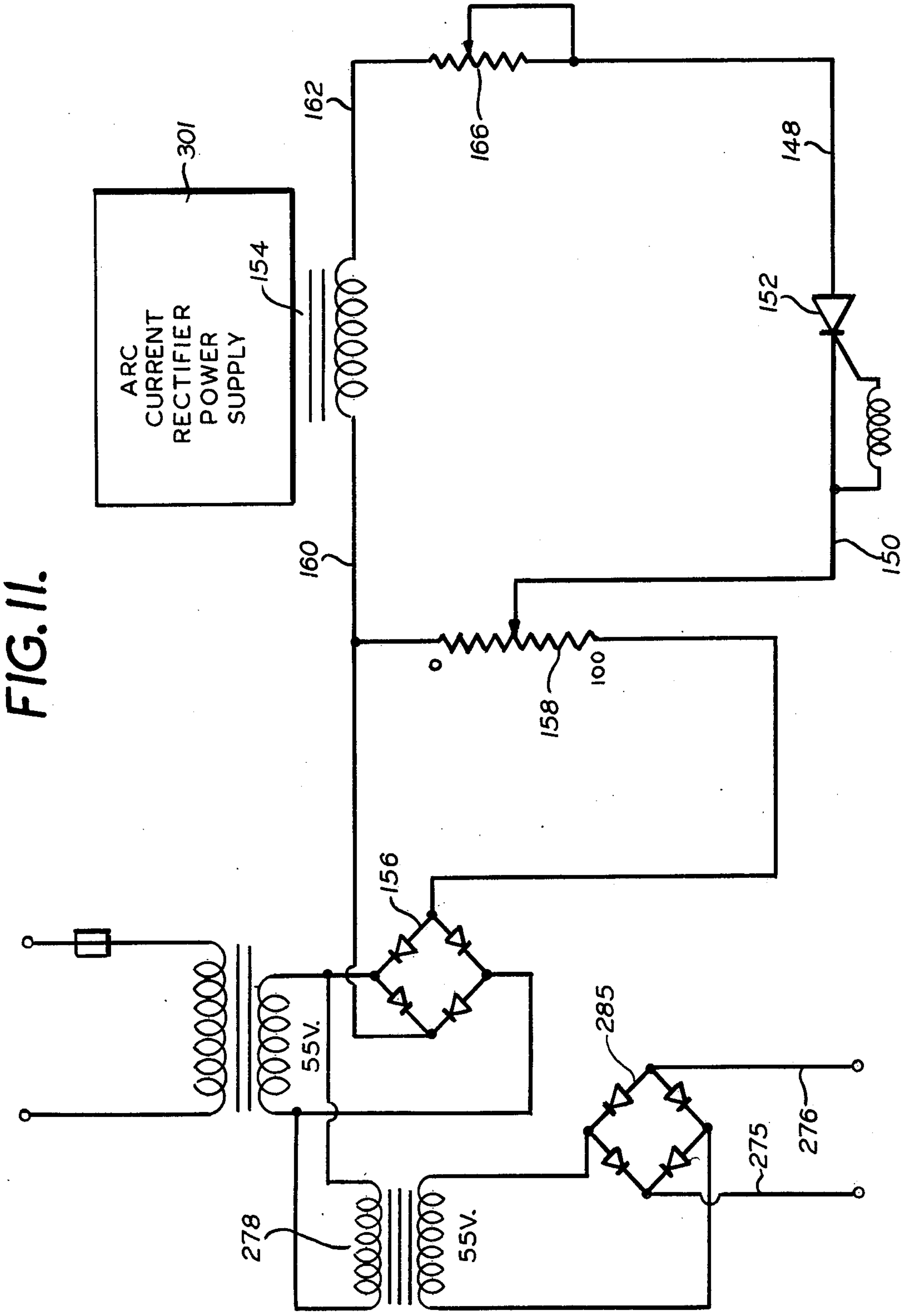
FIG. 11 shows the control circuitry in the arc current rectifier power supply for the closed loop system.

When the closed loop system is used, the two-transistor amplifier 144 and 146 in FIG. 14 is powered by the transformer 278 and rectifier bridge 285 shown in FIG. 11. In the closed loop system, the arc current control 158 in FIG. 11 is set to the maximum position, and the resistor 288 in FIG. 14 becomes the arc current control for adjusting plasma arc current. The amplifiers shown in FIGS. 9 and 10 and the SCR control circuits shown in FIG. 14 can be either composed of discrete components, as shown, or be integrated circuits.

A device to adjust a plasma gas flow rate in response to a control signal can be constructed. The valve resembles a standard gas solenoid with a plunger and seal assembly that is very light in weight, typically less than 1 ounce. This will have a response time of less than 1 millisecond. The coil for the solenoid is a direct current winding. In practice the coil is connected in series with a silicon controlled rectifier. The conduction of the SCR is controlled by a feedback signal in such a way that the gas solenoid valve is caused to open and close in response to the portion of the rectified waveform supplied by the silicon controlled rectifier. The feedback signal is obtained in any such manner as described for the closed loop systems. As the current in the plasma arc and consequently the feedback circuit is increased, the silicon controlled rectifier causes more gas to flow through the valve and automatically compensates for the increase or decrease in current through the circuit.

What is claimed is:

1. In a plasma flame-spraying apparatus having a source of a primary plasma gas, a source of a secondary plasma gas, a first conduit from said source of primary gas and a second conduit from said secondary gas to a plasma flame-spraying nozzle, the plasma flame-spraying nozzle having a gas inlet, a gas outlet and a passage therethrough between said gas inlet and said gas outlet, an electrode of negative potential juxtaposed to said passage, the wall of said nozzle being an electrode of opposite potential, a source of electrical current in an electrical circuit containing said two electrodes of sufficient power to maintain an electrical arc between said electrodes within said passage, and means for feeding a material to be sprayed into gas passing through said nozzle or into gas passing out of said gas outlet, the improvement wherein:

A. said second conduit includes an electrically responsive valve means for increasing over a period of time the amount of secondary plasma gas flow through said second conduit and into said nozzle from a zero value to a predetermined final working value, said valve responsive to an electric signal such that when said valve is opened by said signal it allows progressively more secondary gas to pass therethrough and into said nozzle;

B. said electrodes in said electrical circuit electrically connected to means for increasing the current through said arc, said means for increasing current comprising a saturable reactor having a control winding, said reactor having electrically connected thereto a source of control current, a silicon control rectifier in the electrical circuit between the source of control current and the conrol winding, the current output side of said saturable reactor electrically connected via a rectifier to said electrode of negative potential, capacitor means in said circuit for gradually advancing the firing angle of said silicon control rectifier until it reaches full conduction with the saturation winding of the silicon control rectifier; and C. said capacitor means and said electrically responsive valve responsive to the same electrical signal in said electrical circuit whereby, during start-up when said circuit is complete, said capacitor means allows increasing more conduction with the saturation winding of said saturable reactor as said electrically responsive valve allows increasingly greater amounts of secondary gas to flow to said nozzle such that the predetermined final full current and full secondary gas flow are reached within predetermined time limits.

2. A plasma flame-spraying apparatus according to claim 1 further comprising an electrical means for insuring that initial establishment of the electric arc in the circuit of the apparatus is automatically established which means comprises an electrical pulsing means for pulsing a high frequency current of pulses of 100 to 500 milliseconds through said circuit containing the arc to be established in said apparatus for a time sufficient to establish an electric arc between said electrode and said nozzle.

3. A plasma flame-spraying apparatus according to claim 2 wherein said means for insuring establishment of the electric arc in the circuit comprises a circuit including a source of current, said circuit comprising a current feed line and a current return line, said current feed line being in series with a first relay switch, a first side of which is in series with a diode, in turn, in series with an ignition coil which ignition coil is parallel with a capacitor, the second side of said first relay switch being electrically connected to a silicon control rectifier feed line, in turn, connected to said silicon control rectifier, said first relay switch having in parallel with the first side thereof a second relay switch one side of which is in series with said diode, said resistor and said coil, the other side of which is connected to said silicon control rectifier feed line, said coil being operative to pulse current through said first switch and said second switch and to break the current into pulses of 100 to 500 milliseconds.

* * * * *